United States Patent [19]

Wiercinski et al.

[11] Patent Number: 4,600,635
[45] Date of Patent: Jul. 15, 1986

[54] BITUMEN ADHESIVE AND WATERPROOFING MEMBRANES CONTAINING SAME

[75] Inventors: Robert A. Wiercinski, Somerville; Stephen J. Whicher, Wakefield, both of Mass.

[73] Assignee: W. R. Grace & Co., Cambridge, Mass.

[21] Appl. No.: 723,995

[22] Filed: Apr. 17, 1985

[51] Int. Cl.$^4$ ................................. B32B 7/00
[52] U.S. Cl. ....................... 428/220; 524/62; 524/64; 524/68; 524/69; 428/521; 428/489; 428/497
[58] Field of Search ............... 524/62, 64, 68, 69; 428/220, 521, 489, 497

[56] References Cited

U.S. PATENT DOCUMENTS

| | | | |
|---|---|---|---|
| 3,801,531 | 4/1974 | Berejka et al. | 160/33.4 |
| 3,836,511 | 9/1974 | Clark et al. | 260/79.3 |
| 3,867,247 | 2/1975 | Clark et al. | 161/88 |
| 4,235,953 | 11/1980 | Kumins et al. | 524/62 |
| 4,370,432 | 1/1983 | Agarwal et al. | 524/216 |
| 4,371,640 | 2/1983 | Agarwal et al. | 524/66 |
| 4,371,641 | 2/1983 | Boyer et al. | 524/70 |
| 4,376,179 | 3/1983 | Agarwal et al. | 524/65 |
| 4,385,141 | 5/1983 | Agarwal et al. | 524/66 |
| 4,387,174 | 6/1983 | Lundberg et al. | 524/66 |
| 4,420,524 | 12/1983 | Gorgati | 428/110 |
| 4,459,157 | 7/1984 | Koons | 524/62 |
| 4,524,156 | 6/1985 | Cogliano | 521/83 |

OTHER PUBLICATIONS

"Gilsonite" in Kirk–Othmer: Encyclopedia of Chemical Technology, vol. 11, 3rd ed., 1980.

*Primary Examiner*—Melvyn I. Marquis
*Attorney, Agent, or Firm*—John J. Wasatonic; William L. Baker

[57] ABSTRACT

Pressure sensitive bitumen-based adhesive compositions are provided which comprise bitumen, oil, an ionomeric elastomer, and gilsonite. The adhesives are particularly useful as self adherent waterproofing layers in roofing. The presence of gilsonite can result in substantial increases in the shear strength of these adhesives at the relatively high temperatures encountered in roofing applications.

Also provided are waterproofing membranes comprising the inventive adhesive compositions.

19 Claims, No Drawings

BITUMEN ADHESIVE AND WATERPROOFING MEMBRANES CONTAINING SAME

BACKGROUND OF THE INVENTION

This invention relates to pressure sensitive bitumen-based adhesives which are adapted to provide increased shear strength and flow resistance at the elevated temperatures often encountered in roofing applications. The invention also relates to self-adherable waterproofing membranes comprising the adhesive compositions of this invention.

Compositions containing a mixture or blend of a bitumen, oil, and certain rubbers (usually styrene-butadiene rubbers) have been used as pressure sensitive adhesives in waterproofing applications. (For the sake of easy reference and brevity, these bitumen-oil-rubber adhesives are referred to hereinafter simply as "bitumen-based adhesives".) Generally, the bitumen-based adhesives are capable of being formed into pressure sensitive adhesive layers which can be adhered to a substrate at ambient temperature to provide a waterproofing covering. Although these layers can be self supporting and thus not require a permanently adhered support or carrier, the commerical products employing such layers generally have included a support layer to which one face of the pressure sensitive adhesive layer is adhered. Typical of the support layers which have been used are polymeric sheets, e.g. polyethylene, polypropylene, polyvinylchloride, polyvinylfluoride and polyethylene terephthalate sheets and various woven or non-woven backings. Among the more preferred support layers are the biaxially oriented or oriented and cross-laminated polyolefin films disclosed in Canadian Pat. No. 1,008,738.

Membranes comprising a waterproofing adhesive layer of a bitumen-based adhesive have been widely used in roofing applications, i.e., as self adherable roofing membranes applied to a roofdeck substrate, as below grade waterproofing coverings, e.g., in waterproofing concrete foundations, plaza decks, bridge decks, and the like, aand in pipe wrapping applications. The bitumen-based adhesive layer provides a fully adhered waterproof layer which is self sealing and provides excellent waterproofing protection, this being in addition to the waterproofing protection provided by any support layer which might be used.

Although the waterproofing roofing membranes comprising these adhesives have heretofore been capable of application to a substrate under a wide variety of conditions, it has generally been required that the temperature of the substrate to which the membrane or, more specifically, the adhesive layer is to be applied is at least about 40° F., more preferably at least about 50° F. This limitation is primarily due to an insufficient degree of adhesiveness or "tack" at temperatures below about 40° F. Thus, application of these membranes has been restricted on a seasonal basis in the more northern climates.

The tack of bitumen-based adhesives tends to increase as the proportion of rubber is decreased or as the proportion of oil is increased. However, as a practical matter, neither of these options has proven to be a satisfactory means of improving the low temperature tack of the adhesive. Lowering the rubber content to the degree necessary to attain a significant increase in low temperature tack has resulted in an unacceptable decrease in the cohesive strength of the adhesive. This, in turn, has adversely affected the shear strength and flow resistance of the adhesive, particularly at higher temperatures of use. In addition, decreasing the rubber content has generally had an adverse affect on the flexibility of the adhesive. This can be especially troublesome at lower temperatures of use, e.g., from the standpoint of having sufficient flexibility to permit satisfactory performance while adhered to a substrate at very low temperatures, e.g., about −20° F. or less, the adhesive layer having a greater tendency to crack due to embrittlement at these low temperatures.

Increasing the oil content to a degree sufficient to improve low temperature tack to a significant degree also results in unacceptable decreases in the cohesive strength of the adhesive, thus creating much the same problems at high temperatures as are encountered in lowering the rubber content.

The above considerations are especially important in the case of bitumen-based adhesives intended for use in roofing membranes as opposed, for example, to below grade waterproofing applications. In general, roofing membranes are subjected to the fullest extremes of temperature for a given climate. At the low temperatures of the roofing environment, e.g., down to <20° F., the maintenance of flexibility is important for minimizing embrittlement of the adhesive and resultant cracking due to foot traffic or other stresses to which the adhesive layer may be subjected. At the typical high temperatures of the rooftop environment, e.g., 140° F. or higher, maintenance of high temperature flow resistance and shear strength is important for preventing flow of the adhesive e.g., on sloped roofs, and for preventing localized displacement of the adhesive, e.g., due to foot traffic or the weight of overlying ballast. Thus, the combination of low temperature flexibility and high temperature shear strength and flow resistance is particularly desirable in adhesives intended for use in roofing. In view of the adverse effect on these properties resulting from the aformentioned adjustments of oil and rubber content, such adjustments proven to be particularly unsatisfactory as a means of improving the low temperature tack of bitumen-based roofing adhesives.

Our copending application Ser. No. 724,000, filed of even date, discloses that bitumen-based adhesives comprising bitumen, oil, and an ionomeric elastomer can be formulated to provide significantly improved low temperature tack without undue adverse effect on the low temperature flexibility or high temperature shear strength or flow resistance of the adhesive. The ionomeric elastomer serves as a rubber component of these adhesives which effectively replaces part or all of the conventional rubbers (usually styrene-butadiene copolymers) heretofore used. It was found that ionomeric elastomers could be incorporated into these compositions in much lower proportional amounts than the previously used rubbers, thereby providing a significant improvement in the low temperature tack of the adhesive, and that the resultant adhesive composition could be modified, as necessary, to achieve desired low temperature flexibility or high temperature shear strength and flow resistance.

The present invention is directed to adhesive compositions of the type disclosed in the aforementioned application which are modified by the incorporation of an additional component which increases the high temperature shear strength and flow resistance to levels desired for roofing applications while maintaining the improved low temperature tack of the adhesive and its low temperature flexibility.

SUMMARY OF THE INVENTION

According to this invention, it has been discovered that the addition of gilsonite to the bitumen-based adhesives of the aforementioned application increases the shear strength and flow resistance of the adhesive. More particularly, it has been found that gilsonite can be used to provide substantial increases in these properties at the relatively high temperatures encountered in rooftop applications. It has also been discovered that this degree of improvement can be attained with the use of relatively small amounts of gilsonite and that such small amounts allow the low temperature flexibility of the adhesive to be maintained at a satisfactory level. The resultant adhesives are thus especially well adapted for use in roofing applications, and particularly for use in roofing applications as self-adherable waterproofing layers which are to be subjected to the greater extremes of temperature typically encountered in such applications.

The invention is accordingly directed to adhesive compositions which comprise bitumen, oil, an ionomeric elastomer, and a naturally occuring or synthetic gilsonite. In a preferred embodiment, the adhesives of this invention comprise about 0.5 to about 10 parts by weight of gilsonite per 100 parts by weight of bitumen.

The present invention is also directed to waterproofing membranes comprising the adhesives of this invention. The membranes may comprise the adhesive as an integral, monolithic layer without a support per se, although it may include a reinforcement such as a scrim material partially or fully embedded in the adhesive layer. Preferably, the membranes comprise the adhesive layer and a support layer which is either directly adhered to the adhesive layer or indirectly adhered to the adhesive layer, e.g., through one or more intermediate layers.

DETAILED DESCRIPTION OF THE INVENTION

Gilsonite is a commerically available mineral which is sometimes referred to as uintaite. It is comprised of at least 50% by weight of asphaltenes and has a nominal melting point in the range of 320° F. to 385° F. A discussion of gilsonite mineral and its properties and uses is provided in Kirk-Othmer, Encyclopedia of Chemical Technology, 3rd ed., Vol. 11, p. 802, which is incorporated herein by reference. In addition to naturally occurring gilsonite, man-made gilsonites have been prepared, e.g., as a flake asphaltene residuum of bituminous solvent extraction processes. As used herein, the term "gilsonite" refers to both the naturally occurring mineral and the man-made materials having the high asphaltene contents found in the naturally occurring mineral.

The term "bitumen" is used herein in a broad context to refer to the solid or semi-solid residue obtained on the removal of the volatile components from crude oil, either by natural processes or distillation of the crude oil, inclusive of those materials which are commonly referred to "asphalts" (i.e., naturally occurring or manufactured bitumen or asphalt). Further, for the sake of brevity and convenience, the term "bitumen" is meant also to refer to tars and pitches, these being at least bituminous materials if not "true" bitumens. In general, the adhesives of this invention will utilize the manufactured bitumens or asphalts obtained as crude oil distillation residues.

The present invention relates to pressure sensitive adhesive compositions comprising bitumen, oil, an ionomeric elastomer, and gilsonite. As indicated above, the incorporation of gilsonite into such compositions increases the shear strength and flow resistance of the composition. In particular, it has been discovered that the gilsonite can result in substantial increases in these properties at the higher temperatures typically encountered in roofing applications. Thus, while the present compositions can be used as pressure sensitive adhesives and waterproofing materials in a variety of applications, they are of particular interest for use as self-adherent waterproofing layers in roofing. Generally, the adhesive layer is incorporated into a waterproofing membrane construction comprising this layer and a support sheet or material, e.g., a scrim material or plastic sheet, adhered to one surface of the adhesive layer. Waterproofing membranes of this general type and their utilization are well known in the art and are described, e.g., in U.S. Pat. Nos. 3,741,856; 3,900,102 and 4,386,981. The increased shear strength and flow resistance provided by the gilsonite at the higher temperatures of the rooftop environment is advantageous in helping to minimize thermally induced movement of these membranes when adhered to the rooftop substrate. This improvement in properties is also advantageous in that the adhesive layer, which generally has a thickness of about 10 to 100 mils, has a decreased tendency to undergo localized displacement at the high rooftop temperatures, e.g., due to foot traffic or the weight of overlaying ballast, or to flow due to a slope in the roof surface. The adhesive layers of this invention are thus better able to maintain a uniform thickness and provide a more reliable waterproofing barrier.

The gilsonite may be incorporated into the compositions of this invention in any suitable amount, as necessary to provide desired physical properties in the composition. The preferred compositions of this invention comprise about 0.5 to 10 parts by weight of gilsonite, more preferably about 1 to 5 parts by weight of gilsonite, per 100 parts by weight of bitumen. Although the shear strength and flow resistance afforded by the addition of gilsonite can vary depending on the particular composition, gilsonite concentrations within the preferred range generally provide sufficient improvement in these properties to substantially upgrade the performance of the adhesive at the relatively high rooftop temperatures, e.g., in the range of 120° F. to 160° F. Gilsonite concentrations in excess of about 10 parts by weight per 100 parts by weight of bitumen may be used to provide even higher shear strength and flow resistance. However, such concentrations have generally proven to have an adverse effect on the flexibility characteristics of the adhesive. As disclosed in copending application Ser. No. 724,000, preferred bitumen-based adhesives of that application are those comprising a bitumen which combines a penetration of at least about 25 dmm. at 40° F., as measured according to the procedure set forth in ASTM D-5, with a Ring and Ball softening point of at least about 175° F., as measured according to the procedure set forth in ASTM D-36.

The use of such bitumens results in compositions having a high degree of flexibility at the lower temperatures encountered in roofing applications, e.g., as low as −20° F., thus minimizing embrittlement of the adhesive layer and resultant cracking when subjected to foot traffic and other stresses at such low temperatures. Such bitumens are also preferred for use in the present compositions in order to provide similar low temperature flexibility. However, it has been found that gilsonite concentrations in excess of about 10 parts by weight per 100 parts by weight of bitumen generally result in a substantial decrease in the low temperature flexibility imparted by such bitumens, such that gilsonite concentrations below this level are generally preferred. Gilsonite concentrations of less than about 5 parts by weight per 100 parts by weight of bitumen are even more preferred in order to attain optimal flexibility.

The ratio of bitumen: oil: ionomeric elastomer: gilsonite can be varied as necessary to attain desired properties. Generally, the compositions of this invention comprise about 1 to 50, more preferably about 4 to 25 parts by weight of ionomeric elastomer per 100 parts by weight of bitumen, about 10 to 130, more preferably about 40 to 90, parts by weight of oil per 100 parts by weight of bitumen, and about 0.5 to 10, more preferably about 1 to 5, parts by weight of gilsonite per 100 parts by weight of bitumen. Particularly preferred compositions are those comprising about 6 to 15 parts by weight of ionomeric elastomer, about 50 to 80 parts by weight of oil, and about 1 to 5 parts by weight of gilsonite, per 100 parts by weight of bitumen.

The ionomeric elastomer serves as a rubber component of the compositions of this invention and, in effect, fully or partially replaces the conventional rubbers (usually styrene-butadiene copolymers) heretofore used in bitumen based adhesives. It has been found that ionomeric elastomers can be incorporated into the present compositions in much lower proportional amounts than the previously used rubbers, thereby providing a significant improvement in the low temperature tack of the adhesive.

Thus, it is preferred to employ less than about 15% by weight of the ionomeric elastomer, based on the total weight of the bitumen, oil, elastomer, and gilsonite. Generally, an elastomer content below about 10% by weight is required for purposes of providing desired improvements in low temperature tack. An even more preferred level is less than about 8% by weight and generally the ionomeric elastomer is employed at a weight concentration range of about 3% to about 8%, based on the total weight of the bitumen, oil, elastomer, and gilsonite.

Bitumens are commonly classified by penetration grade (ASTM D-5) Ring and Ball softening point (ASTM D-36). Any bitumen suitable to provide desired physical properties may be used in the present compositions. However, as disclosed above, it is preferred to use bitumens which combine a penetration of at least about 25 dmm. at 40° F. with a Ring and Ball softening point of at least about 175° F. Preferably the softening point of the bitumen is in the range of about 210° F. to 230° F.

The oil component of the present compositions, as in all bitumen-oil-rubber adhesives, serves as a plasticizer for the bitumen, a processing aid, e.g., in facilitating dissolution of the rubber component or ionomeric elastomer in the bitumen, or as a bitumen modifier, e.g., to increase the tack of the bitumen. Any oil serving one or more of these functions may be employed in the present compositions and, in general, any of the various oils used in prior bitumen-based adhesives, commonly referred to as "extender oils" can be used in the present compositions. These oils are generally classified as either naphthenic, aromatic, or paraffinic, with the aromatic oils being preferred for use in this invention. An expecially preferred aromatic oil is Sundex 790T, sold under that trademark by the Sun Oil Company.

It should be understood that bitumens may include a naturally occurring oil component and that this oil component can vary in type and amount as a function of the source of the bitumen and method of manufacture. The oil component of the present compositions is to be distinguished from these naturally occurring bitumen oils. Thus, the oil component of this invention is a separate additive oil or mixture of additive oils which is incorporated into the bitumen-based adhesive composition as part of its manufacture and provides one or more of the above described functions. Consistent with this, any quantities or proportions of oil presented herein refer to the quantity of this added ingredient oil only, and are thus exclusive of any naturally occurring oil contained in the bitumen. Similarly, any quantities or proportions of bitumen presented herein refer to the bitumen as manufactured or naturally occurring and thus are inclusive of any naturally occurring oil in the bitumen.

As used herein, the term "ionomeric elastomer" refers to any of the elastomeric polymers which contain ionic groups pendant to the polymer backbone and which can be crosslinked by ionic bonding between these groups. A matrix of an ionomeric elastomer will contain microphase-separated ionic domains formed by aggregation of the pendant ionic groups and it is within these ionic aggregates or domains that the ionic crosslinking is effected. Thus, the ionomeric elastomers contain at least the minimum amount of pendant ionic groups which is sufficient to permit the formation of these ionic aggregates in the pure polymer matrix. Normally, the ionomeric elastomers contain at least about 0.1 mole percent ionic groups, i.e., at least about 1 pendant ionic group per 1000 monomer repeat units, and preferably at least about 1 mole percent. The ionic groups should not, however, be present in amounts which make the polymer water soluble. Such amounts will vary depending on the nature of the polymer backbone and the particular ionic group or groups present. Normally, a satisfactory upper level of ionic group content is less than about 30 mole percent.

The ionomeric elastomers may comprise pendant carboxylic, sulfonic, or phosphonic acid groups. They are normally prepared by incorporating the acid group into an olefinically unsaturated elastomer with an acid group producing reactant or by compolymerization of nonionic monomers with ionic group containing monomers. Methods of preparation of ionomeric elastomers are disclosed, for example, in U.S. Pat. Nos. 3,642,728; 3,801,531; 3,867,247; 4,370,432; and 4,385,141.

The olefinically unsaturated elastomers from which the ionomeric polymers may be derived include butyl rubber, halogenated butyl rubber, ethylene-propylene-diene terpolymers, styrene-butadiene rubbers, polybutadiene, polyisoprene, natural rubber, and various other elastomers containing either high or low olefinic unsaturation.

After incorporation of an appropriate acid group or groups into the elastomer, the acid groups are at least partially neutralized with cations such as metal or amine cations to ionically crosslink the polymer. The metal ions are normally mono-, di- or travlent ions of metals of Groups I, II, III, IV-A and VIII of the Periodic Table of Chemical Elements. Suitable monovalent metal cations include sodium, potassium, lithium, cesium, silver, mercury, and copper in its monovalent state. Diavalent metal cations which are suitable include ions of beryllium, magnesium, calcium, strontium, barium, cadmium, copper, mercury, tin, lead, iron, cobalt, nickel, zinc, and the like. Suitable trivalent metal cations include aluminum, iron, and the like. The preferred metals are zinc and the alkali metals. More than one metal ion can be employed in the formation of the neutralized ionomeric elastomer and combinations of metal ions may be preferred under certain applications.

The partially or completely neutralized sulfonated ionomeric elastomers are preferred for use in this invention. Particularly preferred are the partially or completely neutralized sulfonated ethylene-propylene-diene (EPDM) terpolymers, hereinafter referred to as "SEPDM" elastomers. SEPDM elastomers are derived by sulfonation of at least some of the olefinic unsaturation sites of elastomeric EPDM base polymers, e.g., in accordance with the preparative methods of U.S. Pat. Nos. 3,642,728 and 3,836,511, both of which are incorporated by reference herein.

With regard to the base polymer, the term "EPDM" is used herein in the sense of its definition as found in ASTM-D-1418-64 and is intended to mean a terpolymer containing ethylene and propylene in the backbone and a diene in the side chain. Illustrative methods for producing these polymers are found in U.S. Pat. No. 3,280,082; British Pat. No. 1,030,289 and French Pat. No. 1,386,600. The preferred EPDM polymers contain about 45 to about 80 weight percent ethylene and about 2 to about 10 weight percent of a diene monomer, the balance of the polymer being propylene. The diene monomer is preferably a non-conjugated diene. Illustrative of the non-conjugated diene monomers which may be used in the terpolymer EPDM are hexadiene, dicyclopentadiene, 5-ethylidene-2-norbornene, 5-methylene-2-norbornene, 5-propenyl-2-norbornene, and methyl tetrahydroindene. The base EPDM terpolymers useful in preparing the sulfonated ionomers usually have a number average molecular weight (Mn) as measured by GPC of about 10,000 to about 200,000 more preferably about 15,000 to about 100,000, for example, about 20,000 to about 60,000. The Mooney viscosity (ML, 1+8, 100° C.) of the EPDM terpolymer is usually about 5 to about 60, preferably about 10 to about 50, for example, about 15 to about 40. The Mv as measured by GPC of the EPDM terpolymer is preferably below about 350,000 and more preferably below about 300,000. The Mw as measured by GPC of the EPDM terpolymer is preferably below about 500,000 and more preferably below about 350,000. A typical EPDM commercially available is a terpolymer having a Mooney viscosity (ML, 1+8, 100° C.) of about 40 and having an ethylene content of about 40 weight percent and a 5-ethylidene-2-norbornene content of about 5.0 weight percent. The Mn of the commercial EPDM, as measured by GPC, is about 47,000, the Mv as measured by GPC is about 145,000 and the Mw as measured by GPC is about 174,000.

The above described polymers are sulfonated in known manners such as by dissolving them in a non-reactive solvent followed by the addition of a sulfonating agent at temperatures normally from −100° C. to +100° C. The sulfonating agent can be any suitable sulfonating agent such as those described in U.S. Pat. Nos. 3,042,728 and 3,836,522, which are expressly incorporated by reference herein.

The resultant sulfonated EPDM typically contains 0.1 to about 20 mole percent SO$_3$H, preferably about 0.5 to about 15 mole perc,nt. The desired range of sulfonation depends on the application and, in the preparation of the polymer for general purposes, is that amount or range which allows processing by extrusion or molding at suitable temperatures below the degradation temperature of the polymer. The desired sulfonation limit for such processability will increase as the molecular weight of the polymer decreases. Illustrative in this regard in U.S. Pat. No. 3,642,728 which teaches a preferred upper sulfonation level (SO$_3$H) for olefinically unsaturated polymers of about 3 mole percent for polymers having a number average molecular weight of about 250,000 and an upper limit of about 9 to 14 mole percent for polymers having a number average molecular weight of about 50,000.

The SEPDM elastomers may be neutralized with any of the metal ions specifically mentioned above but are preferably at least partially neutralized with zinc. It is preferred to utilize SEPDM elastomers in which at least 50% of the acid groups are neutralized, more preferably at least 90% of the acid groups. The most preferred SEPDM elastomers are those in which 95% to 100% of the acid groups are neutralized, most preferably with zinc.

The compositions of this invention can be prepared by blending the bitumen, oil, gilsonite, and ionomeric elastomer and any additional ingredients in various types of mixers at temperatures in the range of about 280° F. To 350° F. Preferably, the ionomeric elastomer and oil are first heated and stirred to provide a homogeneous mix, generally for a period of about 1 to 3 hours, the gilsonite and any additional materials, e.g., fillers, are then added and allowed to become evenly distributed throughout the mix, and the bitumen is then added. The total composition is then maintained within the above temperature range and stirred until a homogeneous mix is obtained, with a typcial mixing time after completion of bitumen addition generally being less than ½ hour.

This invention is further directed to waterproofing membranes comprising the adhesive compositions of this invention. In one form, such membranes are comprised of an integral, monolithic layer of the adhesive without a support per se, although it may include reinforcing means such as woven or non-woven scrim material or reinforcing fibers partially or fully embedded in the adhesive layer. The adhesive layer preferably has a thickness of at least about 0.01 in. order to provide satisfactory waterproofing protection. For ease of handling during transport and application, one or both faces of the adhesive membrane may have a covering layer or sheet releasably adhered thereto, with siliconized paper or plastic being a particularly well known and preferred covering. After application to a substrate, the remaining face of the adhesive membrane, which may be exposed by removal of any releasable covering, may be used to adhere or key a covering material, such as a protective layer of finely divided aggregate or a cladding material, e.g., as described in U.S. Pat. No. 3,900,102, the disclosure of which is incorporated by reference herein.

Preferably, the membranes of this invention comprise the adhesive layer and a non-removable support layer which is either directly adhered to the adhesive layer, i.e., the support and adhesive layers are contacted and adhered to one another, or indirectly adhered to the adhesive layer, i.e., one or more intermediate layers are positioned between the support and adhesive layers and the membrane is an integral laminate of all of these layers. The support may be, for example, a continuous sheet or film or a woven or non-woven scrim or fabric. It may be comprised of inorganic matrials, e.g., continuous sheets of a metal foil or a woven or non-woven glass scrim, or organic materials such as natural rubber or synthetic organic polymers. In general, continuous synthetic organic polymer sheets are the preferred support layers. The synthetic polymers which can be used to form these sheets include polyethylene, polypropylene or other polyolefins, polyamides, polyesters, polyurethanes, polyvinylchloride, polyvinylfluoride, and synthetic rubbers such as polychloroprene or butyl rubber. The polymer sheet may be biaxially oriented or oriented and cross-laminated, e.g., as disclosed in Canadian Pat. No. 1,008,738, and, in particular, high density polyethylene sheets of this type are preferred.

In general, it is desired to have optimum weatherability characteristics in the support layer. The support may be rendered opaque, for example, by the incorporation of a material such as carbon black. Protective coatings and films may be applied in the factory or in the field to those surfaces of the support which are to be exposed to the weather. Moreover, the support may be a single sheet of pre-formed film or it may comprise a plurality of layers, not necessarily identical, laminated together to form a unitary structure. The continuous sheet materials are preferred insofar as they may provide a waterproofing and vapor barrier function in addition to that provided by the adhesive layer.

The support layer of the present membranes will generally have a thickness in the range of about 0.001 inches to about 0.05 inches, more preferably about 0.002 inches to about 0.02 inches. The bitumen-based adhesive layer should be at least 0.01 inches thick and preferably has a thickness in the range of about 0.02 inches to 0.10 inches.

The membranes of this invention which comprise a support in addition to the adhesive may also include a releasable covering on that face of the adhesive layer remote from the support, e.g., as disclosed in U.S. Pat. No. 3,900,102. As noted above, the siliconized papers and polymer films are generally used.

The membranes of this invention may be applied in accordance with procedures well known in the art. Thus, for example, the adhesive layer is applied against the substrate as the releasable covering is removed more or less simultaneously to expose the face of the layer. For a continuous waterproofing course, the membranes are generally applied in overlapping fashion. In order to provide adhesive to adhesive contact and prevent the formation of channels which allow water flow at the overlap joint, the membranes may be fabricated with the adhesive layer protruding beyond at least one longitudinal edge of the support layer, e.g., as disclosed in U.S. Pat. No. 3,900,102.

The membranes of this invention can be prepared by known techniques. Thus, the adhesive may be heated to a temperature which is sufficient to provide desired viscosity and flow for application to the desired substrate (either the support or the releasable covering sheet) and applied thereto in a uniform layer utilizing a suitable coating device. If desired, a reinforcing material may be pressed into the hot adhesive. Any remaining layers are then applied to the exposed adhesive layer, and it may prove desirable to permit the adhesive layer to cool prior to such application, depending on the temperature sensitivity of the remaining layers which are to be applied.

The present invention is further described by the following Examples which are illustrative only and not intended to be of limiting effect. In the following Examples, all proportions are in parts by weight unless otherwise specified.

EXAMPLE 1

A series of adhesive compositions of this invention and reference samples were prepared utilizing the components and proportions shown in Table 1. The bitumen used in each composition had a Ring and Ball softening point of about 225° F. (ASTM D-36) and a penetration at 40° F. of about 36 dmm. (ASTM D-5). The bitumen was a commercially available sample supplied by Trumbull Asphalt Co., Summit, Ill. under the designation "4033 Asphalt". The oil was an aromatic oil sold by Sun Oil Company under the trademark Sundex 790T. The ionomeric elastomer was a 100% zinc neutralized sulfonated EPDM comprising, as the diene monomer, 5-ethylidene-2-norbornene. This elastomer had an average molecular weight of about 50,000 and a degree of sulfonation of 13 $SO_3$-groups per molecule. The gilsonite was a pulverized, naturally occurring gilsonite ("American Gilsonite Selects"grade) obtained from the American Gilsonite Company, Salt Lake City, Utah.

Each of the above formulations was prepared by mixing the oil and SEPDM at room temperature and allowing the mix to stand for at least one hour. The mix was then charged to a sigma blade mixer and blended for 30 minutes at about 300° F. The calcium carbonate and gilsonite were then added and blending continued for about 15 minutes. The bitumen was then added and blending continued for an additional 15 minutes, yielding a smooth, homogeneous mix.

To prepare samples for testing of shear strengths, approximately 30 grams of an adhesive sample were compressed between a sheet of siliconized release paper and a composite sheet of aluminum and polyethylene at 150° F., with the aluminum side facing the adhesive. The resultant adhesive layer had a thickness of about 0.05 inches. The siliconized paper was then removed and a sheet of polyvinyl fluoride pressed against the exposed adhesive to prepare laminate samples. For each sample, the lamination of the polyvinyl fluoride sheet to the adhesive was conducted at the temperature at which the shear strength was to be measured and the sample was maintained at that temperature prior to testing.

The maximum lap shear strengths were measured on an Instron Model 1000 using one inch square samples. Measurements were conducted at 77° F. and 140° F. as indicated with the presentation of results in Table 1.

TABLE 1

| Adhesive Composition | SEPDM | Bitumen | Oil | CaCO$_3$ | Gilsonite | Max. Lap Shear Strength[1] (lbs./sq. in.) 0.005 in./min. | |
|---|---|---|---|---|---|---|---|
| | | | | | | 77° F. | 140° F. |
| 1 | 4.5 | 48.6 | 34.65 | 10.0 | 2.25 | — | .37 |
| 2 | 4.5 | 50.85 | 34.65 | 10.0 | 0 | — | .05 |
| 3 | 5.34 | 50.80 | 32.98 | 8.91 | 1.96 | — | .30 |

TABLE 1-continued

| Adhesive Composition | SEPDM | Bitumen | Oil | CaCO3 | Gilsonite | Max. Lap Shear Strength[1] (lbs./sq. in.) 0.005 in./min. | |
|---|---|---|---|---|---|---|---|
| | | | | | | 77° F. | 140° F. |
| 4 | 5.45 | 51.82 | 33.64 | 9.09 | 0 | — | .12 |
| 5 | 5.4 | 42.3 | 33.3 | 10.0 | 9 | — | .9 |
| 6 | 4.5 | 48.6 | 34.65 | 10.0 | 2.25 | 1.45 | .24 |
| 7 | 5.4 | 51.3 | 33.3 | 9.0 | 1.0 | 2.7 | .43 |
| 8 | 5.4 | 51.3 | 33.3 | 9.0 | 0 | 0.32 | 0.02 |
| 9 | 5.4 | 51.3 | 33.3 | 9.0 | 1.0 | — | 0.31 |
| 10 | 5.4 | 51.3 | 33.3 | 9.0 | 2.0 | 2.83 | 0.31 |

[1]One sample pulled at 0.005 in./min.

The data of Table 1 illustrates the pronounced affect of relatively small quantities of gilsonite in increasing the shear strength of the present compositions at both of the temperatures of testing.

EXAMPLE 2

An adhesive composition was prepared as in Example 1 containing 5.4 parts of the SEPDM of Example 1, 32 parts of Sundex 790T oil, 50 parts of the 225° F. softening point bitumen of Example 1, and 9 parts of calcium carbonate. This composition was divided into four portions to which were added, respectively, 1, 2, 3.8, and 5.7 parts of the gilsonite of Example 1. Flex/fail tests were conducted using six laminate samples for each of the resultant compositions. For these tests, the adhesive was compressed onto an aluminum-polyethylene composite as in Example 1, the releasable paper was removed, and the resultant sample was cooled to −20° F. for about 24 hours. The sample was then manually bent around a ¼ inch mandrel and examined visually for cracking in the adhesive layer. The ratio of the number of samples which did not crack out of the six tested is presented in Table 2.

TABLE 2

| Gilsonite Concentration | Flex/Fail at −20° F. |
|---|---|
| 1 | 6/6 |
| 2 | 5/6 |
| 3.8 | 5/6 |
| 5.7 | 0/6 |

The data of Table 2 illustrates that the relatively low concentrations of gilsonite which provide substantial increases in high temperature shear strengths will generally not have a significant adverse affect on the low temperature flexibility.

What we claim is:

1. A pressure sensitive adhesive composition comprising bitumen, an oil which is not naturally occurring in said bitumen and is selected from the group consisting of naphthenic oils, paraffinic oils, and aromatic oils, an ionomeric elastomer, and gilsonite.

2. A composition of claim 1 comprising about 0.5 to 10 parts by weight of gilsonite per 100 parts by weight of bitumen.

3. A composition of claim 2 comprising about 1 to 5 parts by weight of gilsonite per 100 parts by weight of bitumen.

4. A composition of claim 1 wherein said bitumen has a softening point of at least about 175° F. and a penetration at 40° F. of at least about 25 dmm.

5. A composition of claim 4 wherein said bitumen has a softening point in the range of about 210° F. to about 230° F.

6. A composition of claim 4 comprising less than about 10 parts by weight of gilsonite per 100 parts by weight of bitumen.

7. A composition of claim 4 comprising less than about 5 parts by weight of gilsonite per 100 parts by weight of bitumen.

8. A composition of claim 1 comprising less than about 15% by weight of said ionomeric elastomer, based on the total weight of said bitumen, oil, elastomer, and gilsonite.

9. A composition of claim 8 comprising less than about 10% by weight of said ionomeric elastomer, based on the total weight of said bitumen, oil, elastomer, and gilsonite.

10. A composition of claim 1 wherein said ionomeric elastomer is a partially or completely neutralized sulfonated ionomeric elastomer.

11. A composition of claim 10 wherein said ionomeric elastomer is a zinc neutralized sulfonated ethylene-propylene-diene terpolymer.

12. A pressure sensitive adhesive composition comprising bitumen, about 1 to 50 parts by weight of ionomeric elastomer per 100 parts by weight of said bitumen, and about 10 to 130 parts by weight of an oil which is not naturally occurring in said bitumen per 100 parts by weight of said bitumen, said oil being selected from the group consisting of naphthenic oils, paraffinic oils, and aromatic oils, and about 0.5 to 10 parts by weight of gilsonite per 100 parts by weight of said bitumen.

13. A composition of claim 12 comprising about 4 to 25 parts by weight of said ionomeric elastomer, about 40 to 90 parts by weight of said oil, and about 1 to 5 parts by weight of said gilsonite.

14. A composition of claim 13 comprising about 6 to 15 parts by weight of said ionomeric elastomer; about 50 to 80 parts by weight of said oil, and about 1 to 5 parts by weight of said gilsonite.

15. A composition of claim 14 wherein said bitumen has a softening point of at least about 175° F. and a penetration at 40° F. of at least about 25 dmm., said ionomeric elastomer is a partially or completely neutralized sulfonated ethylene-propylene-diene-terpolymer, and said oil is an aromatic oil.

16. A waterproofing membrane comprising a waterproofing layer of a pressure sensitive adhesive composition comprising bitumen, an oil which is not naturally occurring in said bitumen and is selected from the group consisting of naphthenic oils, paraffinic oils, and aromatic oils, an ionomeric elastomer, and gilsonite.

17. A membrane of claim 16 further comprising a support layer directly or indirectly adhered to said pressure sensitive adhesive layer.

18. A membrane of claim 17 wherein said support layer comprises a woven or non-woven scrim or a continuous sheet of a synthetic organic polymer.

19. A membrane of claim 16 wherein said pressure sensitive adhesive layer has a thickness of at least 0.01 inches.

* * * * *